(12) United States Patent
 Chow

(10) Patent No.: US 9,020,445 B2
(45) Date of Patent: *Apr. 28, 2015

(54) MOBILE PHONE INTERCONNECT TO TELEPHONE

(71) Applicant: Victronix Capital Solution

(72) Inventor: Julia Chow, Los Altos Hills, CA (US)

(73) Assignee: Victronix Capital Solution, Cupertino, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/915,224

(22) Filed: Jun. 11, 2013

(65) Prior Publication Data

US 2014/0031032 A1   Jan. 30, 2014

Related U.S. Application Data

(63) Continuation-in-part of application No. 13/558,196, filed on Jul. 25, 2012, now Pat. No. 8,503,948.

(51) Int. Cl.
 *H04B 1/40* (2006.01)
 *H04W 92/00* (2009.01)
 *H04M 1/82* (2006.01)

(52) U.S. Cl.
 CPC .................. *H04W 92/00* (2013.01); *H04B 1/40* (2013.01); *H04M 1/82* (2013.01)

(58) Field of Classification Search
 USPC ......... 455/74, 74.1, 550.1, 552.1, 556.1, 557, 455/558, 559, 569.1, 575.2; 379/413.01, 379/413.02, 413.03
 See application file for complete search history.

(56) References Cited

U.S. PATENT DOCUMENTS

| | | | |
|---|---|---|---|
| 5,694,465 A * | 12/1997 | Apfel | 379/377 |
| 5,812,637 A | 9/1998 | Schornack et al. | |
| 6,035,193 A | 3/2000 | Buhrmann et al. | |
| 6,909,908 B2 | 6/2005 | Payne et al. | |
| 7,190,954 B2 | 3/2007 | Wonak et al. | |
| 7,376,221 B1 | 5/2008 | Remy et al. | |
| 7,512,114 B2 | 3/2009 | Laturell | |
| 7,519,362 B2 | 4/2009 | LaPerch | |
| 7,623,654 B2 * | 11/2009 | Tischer et al. | 379/413.03 |
| 7,623,667 B2 * | 11/2009 | Sander et al. | 381/74 |
| 8,064,594 B2 | 11/2011 | Mohan et al. | |
| 2007/0105548 A1 | 5/2007 | Mohan et al. | |
| 2007/0135120 A1 | 6/2007 | King et al. | |
| 2007/0270181 A1 | 11/2007 | Michaud | |

FOREIGN PATENT DOCUMENTS

| | | | |
|---|---|---|---|
| WO | WO 2005/002185 A1 | 1/2005 | |
| WO | WO 2005/057956 A1 | 6/2005 | |

* cited by examiner

*Primary Examiner* — Ping Hsieh
(74) *Attorney, Agent, or Firm* — Douglas L. Weller

(57) ABSTRACT

An interface for connects a mobile phone and a plain old telephone service (POTS) phone. The interface detects a ring tone from a speaker output of the mobile phone and in response places a POTS ring signal on a ring line of the POTS phone. Upon a change in state of a hook signal, a hook state detector places a predetermined signal on a microphone input of the mobile phone.

15 Claims, 5 Drawing Sheets

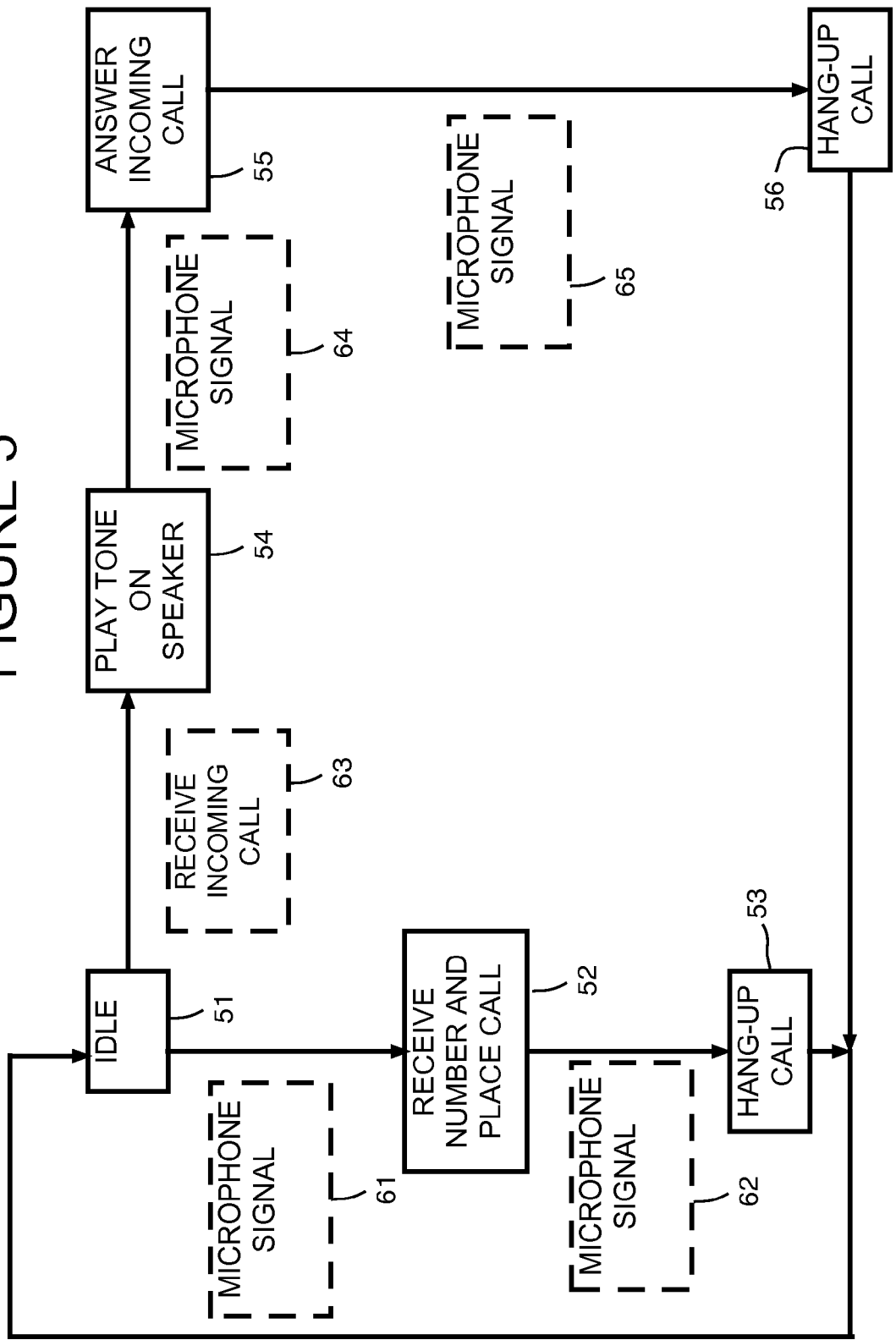

MOBILE PHONE INTERCONNECT TO TELEPHONE

BACKGROUND

A plain old telephone system (POTS) is retronym for a voice-grade telephone service typically used in residential homes and small business. The interface to a POTS phone is typically two wires. The tip line is the ground side (positive) of the telephone circuit. The ring line is the battery (negative) side of the telephone circuit. In the United States, the ring line carries −48 volts of DC voltage when in the hook (idle) state. To ring the phone, about 90 volts of 20 Hz AC current is superimposed over the DC voltage on the ring line.

A phone off-hook creates a DC signal path between the tip line and the ring line, dropping the voltage from the ring line to the tip line to about −3 to −9 volts and drawing about 15 to 20 milliamps at a DC resistance of about 180 ohms. Voice on a telephone network is digitized at 8 kHz sampling rate. Effective transmission across telephone lines occurs essentially between 180 Hz to 3.2 kHz range which is sufficient for speech intelligibility while allowing multiplexing of many calls over coax and twisted pair.

Mobile phones often have a headphone jack which allow a headset to be plugged in. The headset jack typically use three lines: a microphone line, a speaker line and a ground line.

BRIEF DESCRIPTION OF DRAWINGS

FIG. 5 is a simplified flowchart illustrating logic flow of a software module within a cell phone in accordance with an implementation.

DETAILED DESCRIPTION

Figure 1:
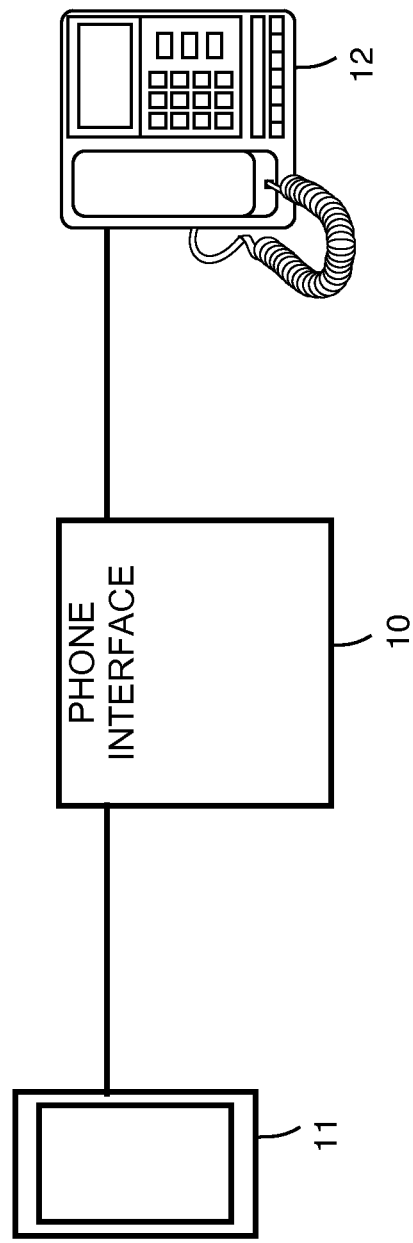
FIG. 1 is a simplified block diagram showing a phone interface connecting a mobile telephone to a POTS telephone in accordance with an implementation.

FIG. 1 shows a phone interface 10 connecting a mobile telephone 11 to a POTS telephone 12. While FIG. 1 shows phone interface 10 connected to a single POTS telephone 12, several POTS telephones may be connected through a two-wire telephone connectors. Likewise, while FIG. 1 shows phone interface 10 connected to a single mobile telephone 11, it is possible to add interfaces for multiple mobile telephones, if desired.

Figure 2:
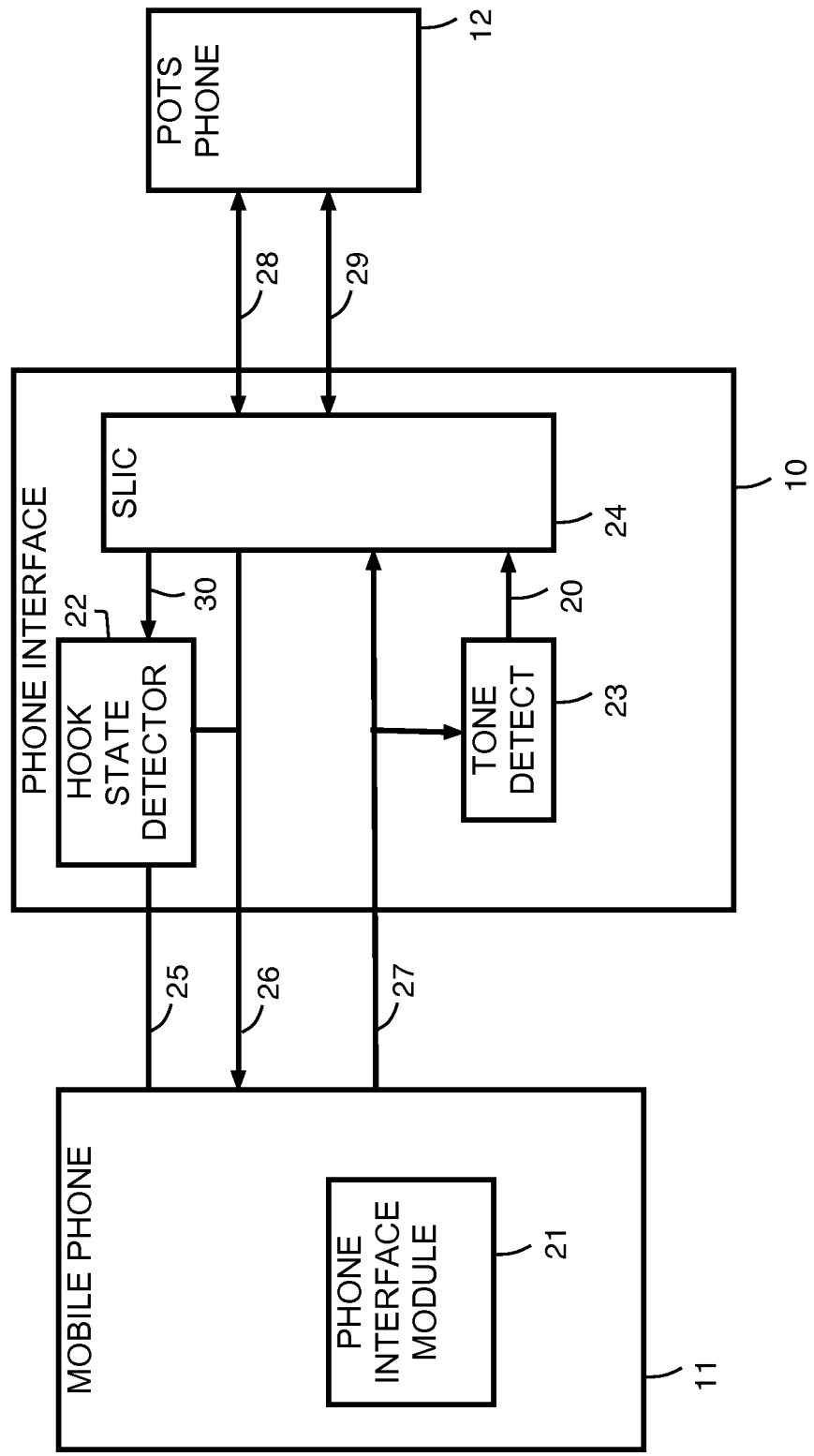
FIG. 2 includes a simplified block diagram of the phone interface shown in FIG. 1 in accordance with an implementation.

FIG. 2 shows additional details of phone interface 10. Phone interface includes a subscriber line interface circuit (SLIC) 24, a hook state detector 22 and a tone detect 23. SLIC 24 is connected to POTS telephone 12 by a tip line 28 and a ring line 29. SLIC 24 produces a hook signal on a line 30 and an audio output signal on a line 26. SLIC receives an audio input signal on a line 27 and a ring signal on a line 20.

Mobile phone 11 receives from hook state detector 22 a ground signal on a line 25. A microphone input of mobile phone 11 is connected to line 26. A speaker output of mobile phone 11 is connected to line 27.

When POTS telephone 12 is in the hook (idle) state, SLIC 24 places a −48 DC voltage on ring line 29 relative to ground voltage on tip line 28. SLIC 24 also places hook signal on line 30 at a first voltage indicating a hook state. When SLIC 24 receives a ring signal on line 20, SLIC 24 superimposes about 90 volts of 20 Hz AC current over the DC voltage across ring line 29 and tip line 28.

When POTS telephone 12 is in the off-hook state, this drops the voltage from ring line 29 to tip line 28 to about −3 to −9 volts and draws about fifteen to twenty milliamps of current from SLIC 24. SLIC 24 also places hook signal on line 30 at a second voltage indicating an off-hook state. SLIC 24 converts an audio signal originating from POTS telephone 12 to an audio output signal on line 26. SLIC 24 converts an audio input signal on line 27 to an audio signal on ring line 29 and tip line 28.

For example, hook state detector 22 is a relay that monitors the hook signal on line 30. Whenever the hook signal on line 30 changes state—from the hook state, indicated by the first voltage, to the off-hook state, indicated by the second voltage, or from the off-hook state to the hook state—hook state detector 22 provides a microphone signal to mobile phone 11. What is meant by a microphone signal herein is that hook state detector places some signal on line 26 that is detected by the microphone input of mobile phone 11. The microphone signal can be fairly simple. For example, hook state 22 connects and then disconnects line 25 and line 26. Alternatively, hook state detector 22 monitors the hook signal on line 30 and places a predetermined tone on line 26 to indicate to mobile phone 11 that there is a change in hook state. Alternatively, hook state detector 22 monitors the hook signal on line 30 and provides some other another predetermined signal to mobile phone 11 that there is a change in hook state.

Tone detect 23 monitors audio input signal on line 27. When mobile phone 27 placed a predetermined tone on line 27, tone detect 23 asserts the ring signal on line 20. For example, the predetermined tone can be superimposed over a default ring tone or over a user programmed ring tone. This can be useful when mobile phone 27 allows a user to program ring tones (for example, popular songs, etc.) or when a default ring tone is complex. The predetermined tone can be, for example a simple tone or even a complex tone. For example, the predetermined tone is set at a frequency that is outside a human ear's frequency range. In this case, mobile phone 27 can still play the default ring tone or the user programmed ring tone, but tone detect 23 will monitor audio input signal on line 27 for the predetermined tone which will be outside a human ear's frequency range.

Figure 3:
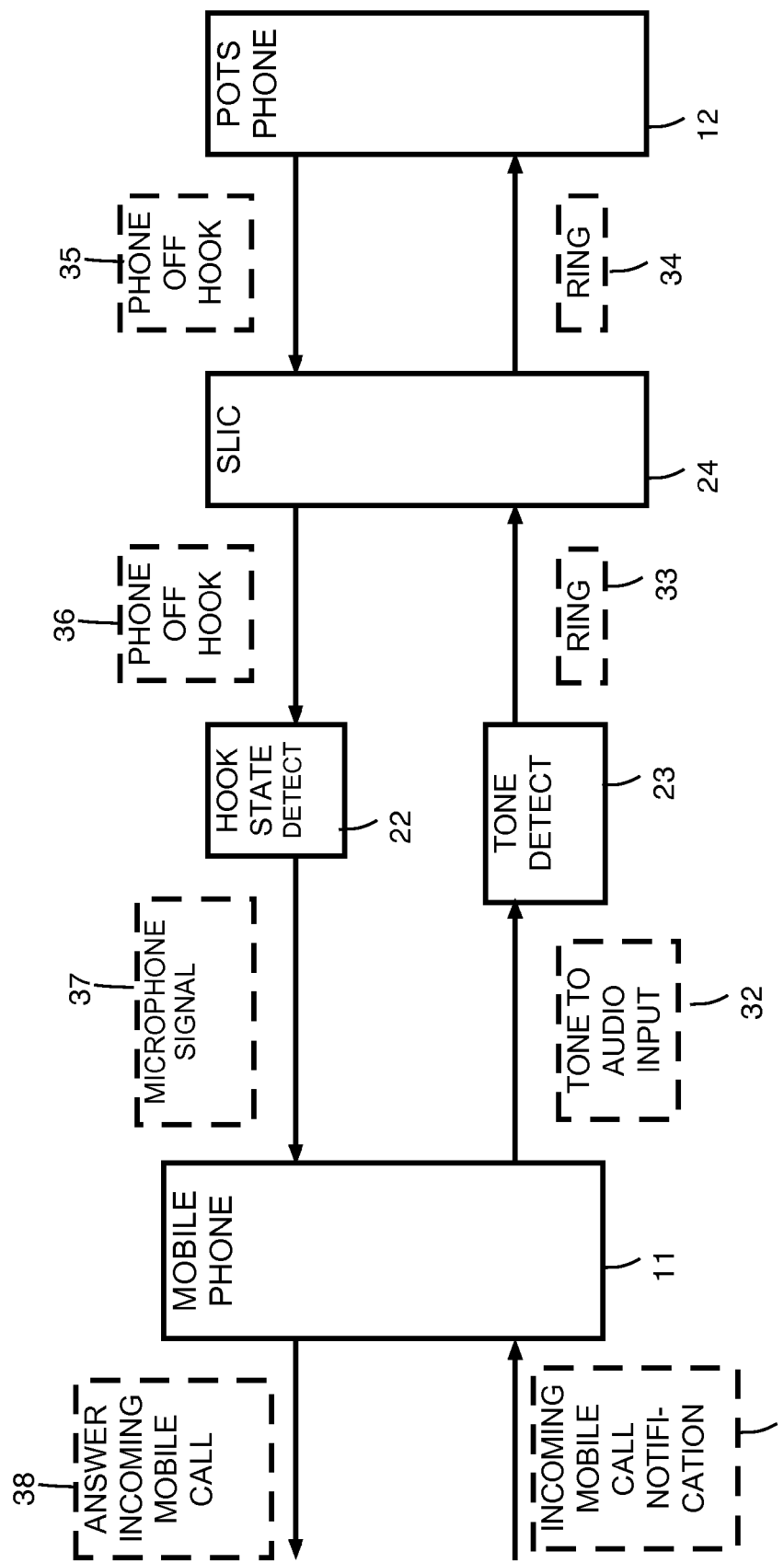
FIG. 3 is a simplified flow chart showing how an incoming mobile call is answered by a POTS telephone in accordance with an implementation.

FIG. 3 is a simplified flow chart showing how an incoming call to mobile phone 11 is answered using POTS telephone 12. A block 31 represents an incoming call notification to mobile phone 11. Upon receipt of the incoming call notification, mobile phone 11 places the predetermined tone on line 27, as represented by a block 32. Tone detect 23 then asserts the ring signal on line 20 as represented by a block 33. As a result, SIC. 24 superimposes the ring signal (90 volts of 20 Hz AC current over the DC voltage) across ring line 29 and tip line 28, as represented by a block 34. POTS telephone 12 then rings indicating an incoming call. This continues until the call is answered using POTS telephone 12, or until the incoming call notification is terminated, for example, by the call being intercepted by a voice mail system, the caller giving up and hanging up, or etc.

If a user answers the call using POTS telephone 12, POTS 12 goes into the off-hook state, which drops the voltage between ring line 29 to tip line 28 to about −3 to −9 volts and draws about fifteen to twenty milliamps of current from SLIC 24. This is represented by a block 35. SLIC 24 also transitions the hook signal on line 30 from the hook state to the off-hook state. This is represented by a block 36. Hook state detector 22 will sense the change in state in line 30 and will produce a microphone signal by connecting, for a short period of time, and then disconnecting line 25 and line 26. This is represented by a block 37. Mobile phone 11 will detect that, for a short period of time, line 25 is shorted to line 26, and in response will answer the incoming call. This is represented by a block 38. For example, in an alternative embodiment, when SLIC 24 transitions the hook signal on line 30 from the hook state to the off-hook state, hook state detector 22 will place a predetermined tone on line 26. In this alternative embodiment, mobile phone 11 will detect the predetermined tone and in response will answer the incoming call.

While the call is active, SLIC 24 converts an audio signal originating from POTS telephone 12 to an audio output signal on line 26. SLIC 24 converts an audio input signal on line 27 to an audio signal on ring line 29 and tip line 28.

When the user hangs up POTS telephone 12, POTS 12 goes into the hook (idle) state where SLIC 24 places a −48 C voltage on ring line 29 relative to ground voltage on tip line 28. SLIC 24 also transitions the hook signal on line 30 from the off-hook state to the hook state. Hook state detector 22 will sense the change in state in line 30 and will produce a microphone signal by connecting, for a short period of time, and then disconnecting line 25 and line 26. Mobile phone 11 will detect that, for a short period of time, line 25 is shorted to line 26, and in response will terminate the call. For example, in an alternative embodiment, when SLIC 24 transitions the hook signal on line 30 from the off-hook state to the hook state, hook state detector 22 will place a predetermined tone on line 26. In this alternative embodiment, mobile phone 11 will detect the predetermined tone and in response will terminate the call.

Figure 4:
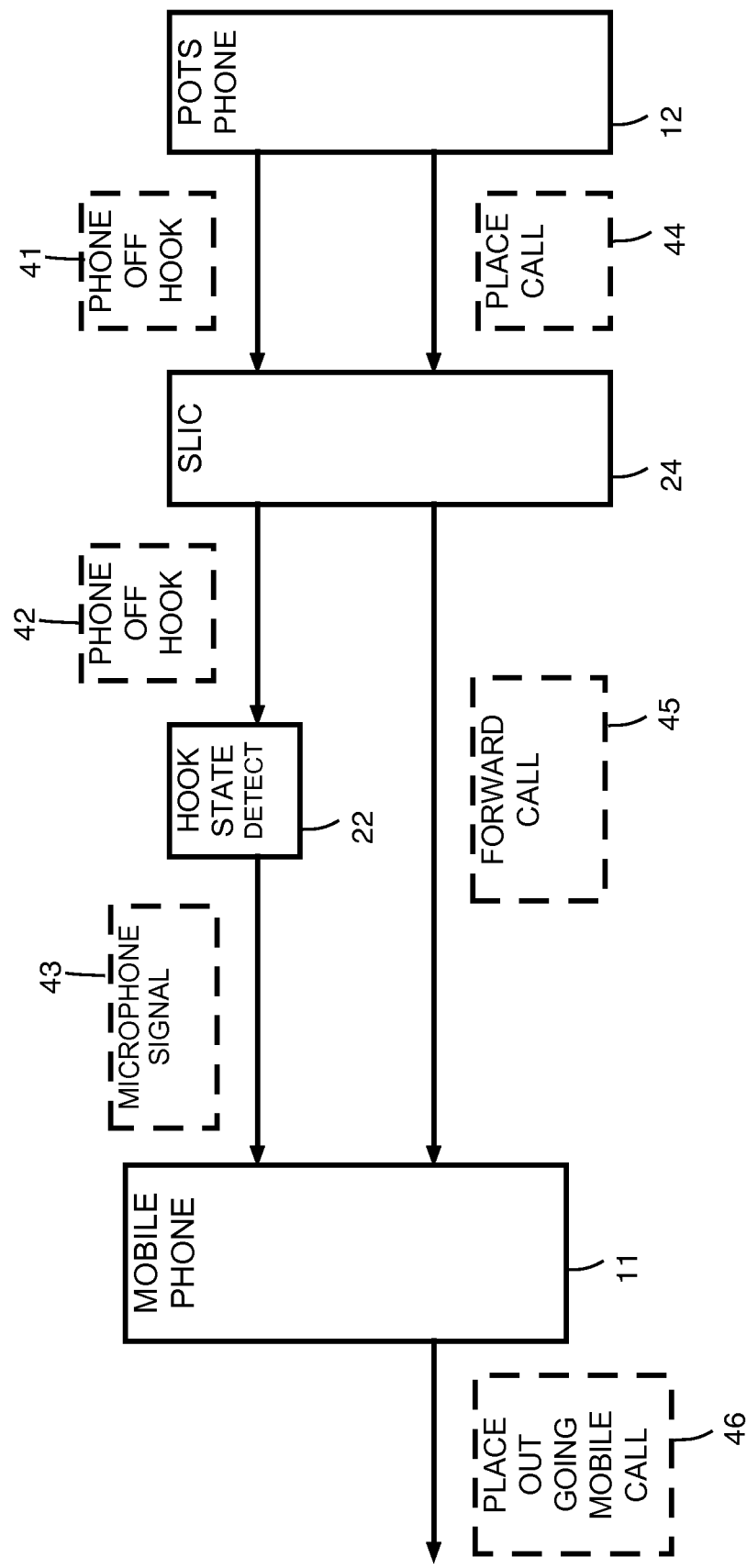
FIG. 4 is a simplified flow chart showing how an outgoing call is initiated by a POTS telephone in accordance with an implementation.

FIG. 4 is a simplified flow chart showing how an outgoing call is initiated by POTS telephone 12. To initiate the call, the user lifts the telephone receiver or in some other way activates POTS telephone 12. As a result, POTS 12 goes into the off-hook state, which drops the voltage between ring line 29 to tip line 28 to about −3 to −9 volts and draws about fifteen to twenty milliamps of current from SLIC 24. This is represented by a block 41. SLIC 24 also transitions the hook signal on line 30 from the hook state to the off-hook state. This is represented by a block 42. Hook state detector 22 will sense the change in state in line 30 and will produce a microphone signal by connecting, for a short period of time, and then disconnecting line 25 and line 26. This is represented by a block 43. Mobile phone 11 will detect that, for a short period of time, line 25 is shorted to line 26, and in response will initiate an outgoing call by, for example, going off-hook. Alternatively, mobile phone 11 can waft to receive a dialed number before going off-hook. For example, in an alternative embodiment, when SLIC 24 transitions the hook signal on line 30 from the hook state to the off-hook state, hook state detector 22 will place a predetermined tone on line 26. In this alternative embodiment, mobile phone 11 will detect the predetermined tone and in response will initiate an outgoing call by, for example, going off-hook.

When mobile phone 11 goes off-hook, SLIC 24 converts an audio input signal on line 27 to an audio signal on ring line 29 and tip line 28. SLIC 24 also converts an audio signal originating from POTS telephone 12 to an audio output signal on line 26. A user of POTS phone 12 will therefore hear a dial tone resulting from mobile phone 11 being off-hook. The user of POTS telephone can then dial a phone number, as represented by a block. SLIC 24 will forward the audio of the dialed number to mobile phone 11, as represented by a block 45. The outgoing call will then be placed through mobile phone 11, as represented by a block 46.

When the user hangs up POTS telephone 12, POTS 12 goes into the hook (idle) state where SLIC 24 places a −48 DC voltage on ring line 29 relative to ground voltage on tip line 28. SLIC 24 also transitions the hook signal on line 30 from the off-hook state to the hook state. Hook state detector 22 will sense the change in state in line 30 and will produce a microphone signal by connecting, for a short period of time, and then disconnecting line 25 and line 26. Mobile phone 11 will detect that, for a short period of time, line 25 is shorted to line 26, and in response will terminate the call. For example, in an alternative embodiment, when SLIC 24 transitions the hook signal on line 30 from the off-hook state to the hook state, hook state detector 22 will place a predetermined tone on line 26. In this alternative embodiment, mobile phone 11 will detect the predetermined tone and in response will terminate the call.

FIG. 5 shows logic flow within phone interface module 21 shown in FIG. 1. In a block 51, phone interface module 21 is an idle state where no calls are incoming or outgoing. When, as represented by a block 61, hook state detector 22 produces a microphone signal by, for example, shorting line 25 to line 26, that is connects the microphone input of mobile phone 11 to the ground of mobile phone 11, this indicates a call is being initiated form POTS telephone 12. In a block 52, phone interface module 21 receives the dialed number from POTS telephone 12 and oversees mobile phone 11 placing a call to the received number. During the call, the microphone input of mobile phone 11 is activated to receive audio from line 25 and the speaker output of mobile phone 11 places audio signals on line 27.

When, as represented by a block 62, hook state detector 22 produces a microphone signal by, for example, shorting line 25 to line 26, that is connects the microphone input of mobile phone 11 to the ground of mobile phone 11, phone interface module 21 hangs-up the cellular call, as represented by block 53 and returns to idle state as represented by block 51.

From the idle state represented by block 51, when mobile phone 11 receives an incoming call, as represented by block 63, phone interface module 21 plays the tone on the speaker output (line 27) of mobile phone 11, as represented by block 64. When, as represented by a block 64, hook state detector 22 produces a microphone signal by, for example, shorting line 25 to line 26, that is connects the microphone input of mobile phone 11 to the ground of mobile phone 11, mobile phone 11 answers the incoming call. During the call, the microphone input of mobile phone 11 is activated to receive audio from line 25 and the speaker output of mobile phone 11 places audio signals on line 27.

When, as represented by a block 65, hook state detector 22 produces a microphone signal by, for example, shorting line 25 to line 26, that is connects the microphone input of mobile phone 11 to the ground of mobile phone 11, phone interface module 21 hangs-up the cellular call, as represented by block 56 and returns to idle state as represented by block 51.

In an alternative embodiment, in block 61, a predetermined tone indicates a call is being initiated form POTS telephone 12. In a block 52, phone interface module 21 receives the dialed number from POTS telephone 12 and oversees mobile phone 11 placing a call to the received number. Likewise, in the alternative embodiment, as a result of a predetermined tone in block 62, phone interface module 21 hangs-up the cellular call, as represented by block 53 and returns to idle state as represented by block 51.

Likewise, in the alternative embodiment, in block 64, a predetermined tone indicates a call is being initiated form POTS telephone 12. As a result, in block 55, mobile phone 11 answers the incoming call. Likewise, in the alternative embodiment, as a result of a predetermined tone in block 65, phone interface module 21 hangs-up the cellular call, as represented by block 56 and returns to idle state as represented by block 51.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. An interface for connection between a mobile phone and a plain old telephone service (POTS) phone, the interface comprising:
    a tone detect that receives an audio signal from the mobile phone and in response to detecting a predetermined tone produces a ring signal;
    a circuit that in parallel to the tone detect receives the audio signal from the mobile phone and that in addition receives the ring signal from the tone detect, the circuit producing:
        a tips signal and a POTS ring signal for the POTS phone,
        an audio out signal for the mobile phone, and
        a hook signal; and,
    a hook state detector having an input connected to the hook signal, having a first output for connection to a ground of the mobile phone and having a second output for connection to a microphone input of the mobile phone, wherein upon a change in state of the hook signal, the hook state detector places a predetermined signal on the microphone input.

2. An interface as in claim 1 wherein when the tone detect produces the ring signal, the circuit places the POTS ring signal on a tip line and a ring line of the POTS phone.

3. An interface as in claim 1 wherein the circuit changes state of the hook signal when, through a change of impedance between the tips signal and the ring signal the circuit detects the POTS telephone transitions from an off hook state to a hook state, or when, through a change of the impedance between the tips signal and the ring signal, the circuit detects the POTS telephone transitions from the hook state to an off hook state.

4. An interface as in claim 1 wherein the predetermined signal placed on the microphone input is produced electrically connecting and then disconnecting the first output to the second output.

5. An interface as in claim 1 wherein the predetermined tone is outside a human ear's frequency range.

6. A method performed by an interface for connection between a mobile phone and a plain old telephone service (POTS) phone, the method comprising:
    detecting a ring tone from a speaker output of the mobile phone and in response placing a POTS ring signal on a ring line and a tip line of the POTS phone; and,
    connecting and then disconnecting a microphone input of the mobile phone and a ground input of the mobile phone when a user activates the POTS phone in response to the ring signal on the ring line of the POTS phone.

7. A method as in claim 6 additionally comprising:
    connecting and then disconnecting the microphone input of the mobile phone to the ground input of the mobile phone when the user activates the POTS phone in order to make an outgoing call on the POTS phone.

8. A method as in claim 6 additionally comprising:
    when a call is active:
        using an audio signal on the speaker output of the mobile phone to produce audio input for the POTS phone; and,
        using audio output from the POTS phone to produce an audio signal for the microphone input of the mobile phone.

9. A method as in claim 6 additionally comprising:
    when a call is active:
        using an audio signal on the speaker output of the mobile phone to produce audio input for the POTS phone; and,
        using audio output from the POTS phone to produce an audio signal for the microphone input of the mobile phone.

10. A non-transitory data storage media comprising:
    program data for controlling a mobile phone to perform the following:
        placing a predetermined tone on a speaker output of the mobile phone when an incoming call is received, the predetermined tone being outside a human ear's frequency range; and,
        accepting and activating the incoming call when a predetermined signal is received by a microphone input for the mobile phone.

11. A non-transitory data storage media as in claim 10 wherein the program data additionally controls the mobile phone to perform the following:
    ending the incoming call when the predetermined signal is received by the microphone input for the mobile phone.

12. A non-transitory data storage media as in claim 10 wherein the program data additionally controls the mobile phone to perform the following:
    initiating an outgoing call when the predetermined signal is received by the microphone input for the mobile phone and a number to be dialed is received.

13. A non-transitory data storage media as in claim 10 wherein placing a predetermined tone on a speaker output of the mobile phone includes superimposing the predetermined tone on a default ring tone of the mobile phone.

14. A non-transitory data storage media as in claim 10 wherein placing a predetermined tone on a speaker output of the mobile phone includes superimposing the predetermined tone on a user selected ring tone of the mobile phone.

15. A non-transitory data storage media as in claim 10 wherein the predetermined signal is a predetermined tone.

* * * * *